(12) United States Patent
Suzuki

(10) Patent No.: US 11,172,540 B2
(45) Date of Patent: Nov. 9, 2021

(54) COMMUNICATION APPARATUS, CONTROL METHOD OF COMMUNICATION APPARATUS, AND STORAGE MEDIUM

(71) Applicant: CANON KABUSHIKI KAISHA, Tokyo (JP)

(72) Inventor: Taito Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 12 days.

(21) Appl. No.: 16/865,641

(22) Filed: May 4, 2020

(65) Prior Publication Data
US 2020/0359456 A1  Nov. 12, 2020

(30) Foreign Application Priority Data
May 10, 2019 (JP) .............................. JP2019-089429

(51) Int. Cl.
| | |
|---|---|
| *H04W 12/12* | (2021.01) |
| *H04W 84/18* | (2009.01) |
| *H04W 60/06* | (2009.01) |
| *H04W 12/06* | (2021.01) |
| *H04W 88/06* | (2009.01) |
| *H04M 1/72412* | (2021.01) |

(52) U.S. Cl.
CPC ....... *H04W 84/18* (2013.01); *H04M 1/72412* (2021.01); *H04W 12/06* (2013.01); *H04W 60/06* (2013.01); *H04W 88/06* (2013.01)

(58) Field of Classification Search
CPC ..... H04W 84/18; H04W 60/06; H04W 12/06; H04W 88/06; H04W 12/08; H04W 12/009; H04W 12/12; H04W 60/00; H04W 76/30; H04W 84/20; H04M 1/72412; H04L 63/14
See application file for complete search history.

(56) References Cited

U.S. PATENT DOCUMENTS

| | | | | |
|---|---|---|---|---|
| 2014/0359763 | A1* | 12/2014 | Black | H04W 12/12 726/22 |
| 2018/0084106 | A1* | 3/2018 | Li | H04W 4/80 |

FOREIGN PATENT DOCUMENTS

| | | |
|---|---|---|
| JP | 2009-290804 A | 12/2009 |
| WO | 2013/100899 A1 | 7/2013 |
| WO | 2015/148103 A1 | 10/2015 |

* cited by examiner

*Primary Examiner* — Said M Elnoubi
(74) *Attorney, Agent, or Firm* — Canon U.S.A., Inc. I.P. Division

(57) ABSTRACT

A communication apparatus includes a registration unit configured to register a slave unit for communication on a wireless network, a receiving unit configured to receive identification information for identifying the slave unit on the wireless network, the identification information being periodically transmitted from the slave unit to the wireless network, a detection unit configured to detect, in a case where the slave unit which is a transmission source of the identification information received by the receiving unit is a slave unit that has been registered for communication by the registration unit, an operation performed on the slave unit without involving the communication apparatus, and an output unit configured to output an alert in a case where the operation is detected by the detection unit.

17 Claims, 12 Drawing Sheets

FIG.5

| Home ID | Node ID | OLD Home ID | OLD Node ID |
|---------|---------|-------------|-------------|
| 1 | 1 | 38 | 1 |
| 1 | 2 | 58 | 0 |
| ... | ... | ... | ... |

NEW IDS ASSIGNED AFTER INCLUSION — OLD IDS RECEIVED IN INITIAL INCLUSION

COMMUNICATION APPARATUS, CONTROL METHOD OF COMMUNICATION APPARATUS, AND STORAGE MEDIUM

BACKGROUND OF THE INVENTION

Field of the Invention

The present invention relates to a communication apparatus that can register another communication apparatus in a wireless network.

Description of the Related Art

A wireless communication standard, to which a wireless communication device that provides communication using radio waves conforms, includes a so-called wireless local area network (LAN) and Wireless Fidelity (Wi-Fi)® that are defined by the IEEE802.11 series standards. In particular, as wireless communication standards for Internet of Things (IoT), there is a plurality of wireless communication standards, such as ZigBee® and Z-Wave®, and the wireless communication standards each have specific features in frequency, reach distance, power consumption, and transfer speed.

To execute communication using radio waves, wireless communication devices need to execute registration processing for mutually registering the wireless communication devices in a wireless network. Information exchange processing (pairing) for executing data encryption is also executed as necessary.

In the case of the above-described Z-Wave® standard (hereinafter, simply referred to as Z-Wave), by a user executing a specific operation on a master unit and a slave unit, processing for registering (including) the slave unit in the master unit, which is referred to as inclusion, is executed. More specifically, in a registration step, by the user performing an operation such as button press on both of the master unit and the slave unit within a predetermined time, the registration processing is started. If the registration processing is started, a state of the master unit transitions to an adding mode, and a state of the slave unit transitions to a learn mode. Thus, it becomes possible for the master unit and the slave unit to exchange identifiers (device types) of the devices that are required for wireless communication, and key information for performing the data encryption.

With regard to deregistration, deregistration from a wireless network is also executed between the master unit and the slave unit that are registered in the wireless network. In the Z-Wave®, to deregister (exclude) communication registration, deregistration processing referred to as exclusion is executed. More specifically, in a deregistration step, similarly to the inclusion processing described above, by the user performing an operation such as button press on both of the master unit and the slave unit within a predetermined time, the deregistration processing is started. If the deregistration processing is started, the state of the master unit transitions to an exclusion mode, and the state of the slave unit transitions to the learn mode. Registration information is deleted from the master unit and the slave unit, and the communication registration of the slave unit is deregistered.

Depending on the wireless communication standard, the processing of deregistering the communication registration can be executed without necessarily involving both of the registered master unit and slave unit in some cases. For example, in the Z-Wave®, if a state of an external master unit not included in a wireless network is shifted to the exclusion mode and a state of a slave unit (which is registered on the network by a different master unit—that is, the original master unit) is shifted to the learn mode, the slave unit can be excluded from communication with the original master unit that has included the slave unit. In this case, information exchange necessary for the exclusion is executed only between the external master unit and the slave unit. Thus, the slave unit can delete registration information regarding the original master unit, but the original master unit keeps holding registration information regarding the slave unit.

Meanwhile, because a wireless communication device does not require a communication cable, in many cases, a power source of the wireless communication device is configured to be driven by a battery so as to avoid using a cable. In particular, a wireless communication device that simply transmits data acquired by various sensors is often driven by a battery. Such a battery-driven device uses a state called a sleep state in which a power source is controlled to supply power only to some necessary functions and not to supply power to the other functions. By transitioning to the sleep state, power consumption can be reduced, and operating time can be increased.

Since the power required for wireless communication generally depends on a range in which radio waves can reach, it is difficult to reduce power consumption during operation of a communication function. For this reason, a battery-driven wireless communication device reduces power consumption by reducing power to be supplied to a communication function portion and transitioning to the sleep state when necessary communication ends or when a communication partner has not performed communication for a certain period of time.

When the battery-driven wireless communication device is a slave unit, if the slave unit reduces the power to be supplied to the communication function portion and transitions to the sleep state, the slave unit does not receive a control command from an external device while the slave unit is in the sleep state. The slave unit cancels the sleep state, for example, when detecting a predetermined state if the slave unit has a sensor function or at regular time intervals if the slave unit has a timer function, and the slave unit communicates with a master unit. In the latter case of cancelling the sleep state at regular time intervals, power consumption can be reduced more, as an interval between cancellations of the sleep state becomes longer. Thus, the interval between cancellations is sometimes set to several hours or more. In this manner, while the slave unit can autonomously cancel the sleep state, the sleep state cannot be cancelled by an external device such as the master unit.

Because, as described above, the processing for deregistering communication registration of a slave unit is executable without involving the original master unit that has included the slave unit, the deregistration of communication registration that is executed by an external device without involving the original master unit may possibly be unauthorized disconnection executed by a third party.

Japanese Patent Application Laid-Open No. 2009-290804 discusses a wireless communication system that adds a disconnection advance notification for notifying a partner apparatus of disconnection in advance, to a frame transmitted before a disconnection frame is transmitted, and transmits, to the partner apparatus that is connected to a wireless communication apparatus and that is serving as a wireless LAN access point, the disconnection frame after the disconnection advance notification is transmitted. If the connected partner apparatus does not receive the disconnection advance notification before receiving the disconnection frame, the partner apparatus ignores the disconnection frame to prevent unauthorized disconnection.

However, it has been difficult to prevent unauthorized disconnection executed by a third party by applying the technique discussed in Japanese Patent Application Laid-Open No. 2009-290804 to a master unit and a slave unit in a Z-Wave® wireless communication system. This is because the Z-Wave® strictly defines the types of commands that can be transmitted and received. The disconnection advance notification is not permitted to be transmitted, and the master unit is not permitted to interrupt the learn mode of the slave unit.

Furthermore, in a case where the slave unit is a battery-driven wireless communication device, the slave unit is normally in the sleep state and does not receive a command from the master unit while in the sleep state. Thus, the master unit cannot inquire about a state of communication with the slave unit.

As described above, a situation can arise where a master unit that has registered a slave unit cannot recognize that unauthorized exclusion of the slave unit has been executed by an external device, and the master unit keeps holding registration information about the slave unit on the assumption that the excluded slave unit is still included. For this reason, a user cannot recognize that communication with the slave unit has been canceled based on information presented in a user interface (UI) of the master unit, and may erroneously conclude that the excluded slave unit is still included. This can impair the operation and management of a wireless communication system.

SUMMARY OF THE INVENTION

Various embodiments of the present disclosure are directed to detecting an unauthorized operation performed on a slave unit by an external device without involving a master unit in a wireless network, and appropriately notifying the user of detection of the unauthorized operation.

According to various embodiments of the present disclosure, a communication apparatus includes a registration unit configured to register a slave unit for communication on a wireless network, a receiving unit configured to receive identification information for identifying the slave unit on the wireless network, the identification information being periodically transmitted from the slave unit to the wireless network, a detection unit configured to detect, in a case where the slave unit which is a transmission source of the identification information received by the receiving unit is a slave unit that has been registered for communication by the registration unit, an operation performed on the slave unit without involving the communication apparatus, and an output unit configured to output an alert in a case where the operation is detected by the detection unit.

Further features of the present invention will become apparent from the following description of exemplary embodiments with reference to the attached drawings.

BRIEF DESCRIPTION OF THE DRAWINGS

FIG. 5 is a diagram illustrating an example of an ID table managed by the communication apparatus according to the present exemplary embodiment.

DESCRIPTION OF THE EMBODIMENTS

Figure 1:
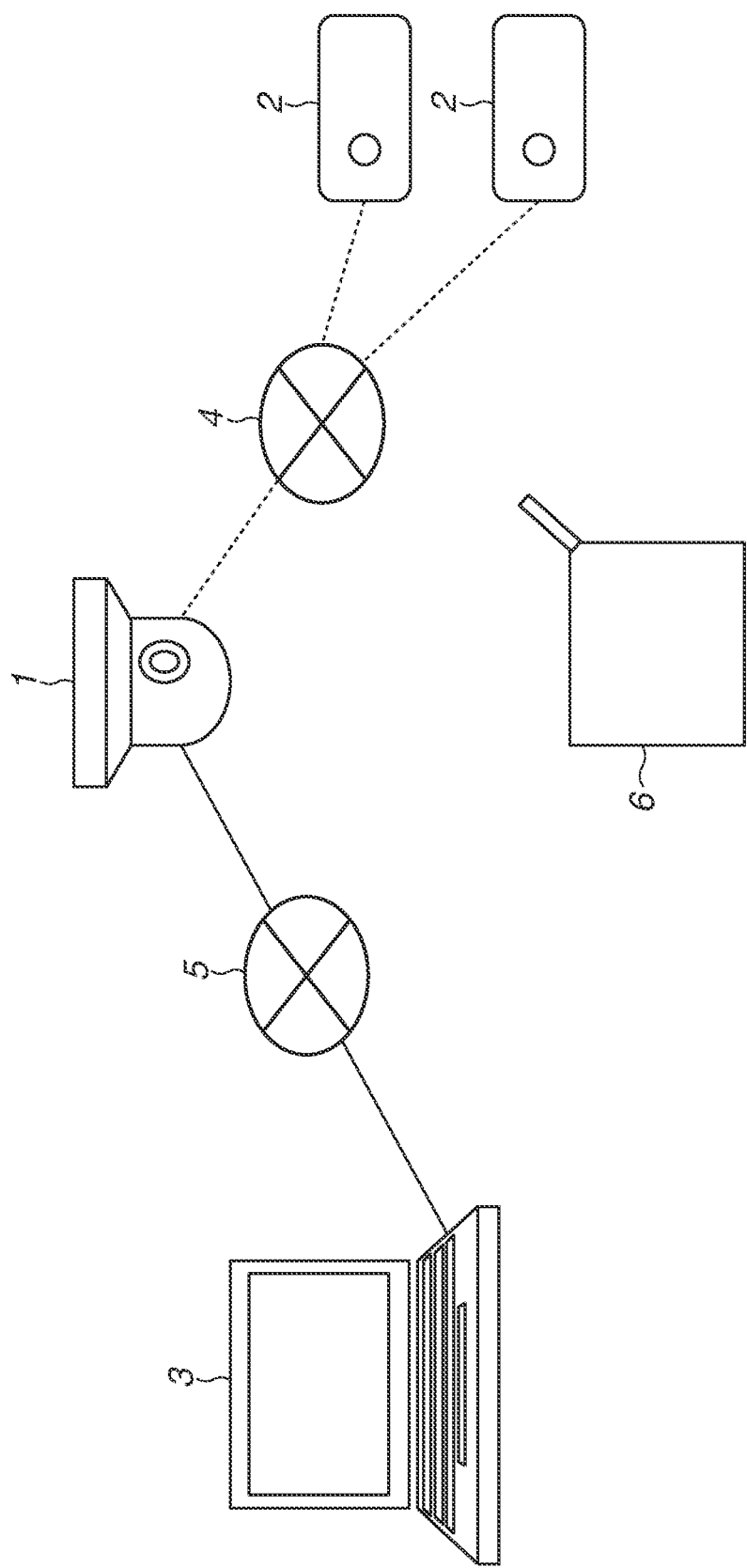
FIG. 1 is a diagram illustrating an example of a network configuration of a network camera system according to the present exemplary embodiment.

Hereinafter, an exemplary embodiment of the present invention will be described in detail with reference to the attached drawings. The following exemplary embodiment is an example of an implementation tool of the present invention and is to be appropriately modified or changed in accordance with various conditions and the configuration of an apparatus to which the present invention is applied. The present invention is not necessarily limited to the following exemplary embodiment. In addition, not all combinations of features described in the present exemplary embodiment are necessarily essential to the solution of the present invention. The same configurations will be indicated with the same reference numerals in the description.

The following description will be given of an example in which a communication apparatus is a network camera including a communication device connected to a wireless network, and the network camera detects an unauthorized operation performed from an external device. However, the present exemplary embodiment is not limited to this, and the communication apparatus may be any other wireless communication device.

The following description will also be given of an example in which the wireless network including the communication apparatus is constructed in conformity to Z-Wave®, but the present exemplary embodiment is not limited to this. The wireless network including the communication apparatus may be constructed in conformity to another communication standard such as ZigBee® and Bluetooth®, which are examples of other wireless communication standards. The wireless network including the communication apparatus may also be any other wireless network constructed in conformity to Bluetooth® Low Energy (BLE) or Wireless Fidelity® (Wi-Fi).

Network Configuration of Present Exemplary Embodiment

FIG. 1 is a diagram illustrating an example of a network configuration of a network camera system according to the present exemplary embodiment.

The network camera system illustrated in FIG. 1 includes a network camera 1 operating as a master unit in the Z-Wave®, sensor devices 2 operating as slave units in the Z-Wave®, and an information terminal 3. The network camera 1 and the sensor devices 2 are connected via a wireless network 4 to be wirelessly communicable with each other. The network camera 1 and the information terminal 3 are connected via an arbitrary network 5, which may be a wired or wireless network.

An external controller device 6 illustrated in FIG. 1 exists near the network camera 1 and the sensor devices 2 so that wireless communication can be performed with the network camera 1 and the sensor devices 2 in conformity to the Z-Wave®, and can access the sensor devices 2. The external controller device 6 does not belong to the wireless network 4 to which the network camera 1 and the sensor devices 2 belong, and is not a component of the network camera system illustrated in FIG. 1.

The network camera 1 can deliver a video via the wired or wireless network 5, can be subjected to various types of camera control performed by another apparatus such as the information terminal 3, and can perform communication defined by the Z-Wave®. The network camera 1 also has a function of a Z-Wave® controller that manages and controls devices such as the sensor devices 2 that are compliant with the Z-Wave® via the wireless communication defined by the Z-Wave® that is performed via the wireless network 4.

Each sensor device 2 may be an existing sensor device, and is connected with the network camera 1 via the wireless network 4. Using a profile defined by the Z-Wave®, the sensor device 2 can transmit numerical data, such as temperature or humidity that has been detected by the sensor device 2, to the network camera 1.

The sensor device 2 can also receive, from the network camera 1, information regarding ON/OFF for controlling the sensor device 2. FIG. 1 illustrates two sensor devices 2, but the number of the sensor devices 2 is not limited to this. The arbitrary number (greater than or equal to one) of sensor devices 2 may operate as slave units in the Z-Wave® on the wireless network 4.

The information terminal 3 is connected with the network camera 1 via the network 5, and can output information transmitted from the network camera 1 using a browser operating on the information terminal 3, and can execute various types of camera control of the network camera 1.

The wireless network 4 enables intercommunication between the network camera 1 and the sensor devices 2 that is compliant with the Z-Wave. In the intercommunication compliant with the Z-Wave, the network camera 1 functions as a master unit, registers the sensor devices 2 on the wireless network 4, and manages the sensor devices 2. The sensor devices 2 function as slave units, and are registered and managed by the network camera 1 on the wireless network 4.

The network 5 is a network for delivering a video captured by the network camera 1 to an external video recording server (not illustrated). In the present exemplary embodiment, the network 5 may be a wired local area network (LAN) that is compliant with a communication standard such as Ethernet®. Alternatively, the network 5 may be a wireless network. The wireless network includes a wireless personal area network (PAN) such as Bluetooth®, ZigBee®, or ultrawideband (UWB). The wireless network also includes a wireless LAN such as Wi-Fi® and a wireless metropolitan area network (MAN) such as WiMAX®. The wireless network further includes a wireless a wide area network (WAN) such as LTE/3G. As long as the network 5 can connect the devices in such a manner that communication can be performed between the devices, the standard, scale, and configuration of the communication are not limited to the above-described examples.

Although the external controller device 6 has a function of the Z-Wave® controller similarly to the network camera 1, the external controller device 6 cannot control the sensor devices 2 because the external controller device 6 does not belong to the wireless network 4 in FIG. 1.

However, the external controller device 6 exists within a communicable range of the wireless network 4. Thus, the external controller device 6 can receive a frame of the Z-Wave® (hereinafter, referred to as a Z-Wave frame) broadcast to the wireless network 4 from the network camera 1 or the sensor device 2.

On the other hand, a Z-Wave frame broadcast from the external controller device 6 to the wireless network 4 can be received by the network camera 1 and the sensor devices 2. The broadcasting refers to simultaneously transmitting a message to all surrounding Z-Wave devices.

As long as the external controller device 6 is a device having a function of the Z-Wave® controller, a specific internal configuration thereof is not limited.

In the present exemplary embodiment, the sensor device 2 is driven by a battery, and has a sleep function for reducing battery power consumption. If communication has not been performed by the network camera 1 for a certain period of time, the sensor device 2 autonomously transitions to a sleep state and does not execute wireless communication while being in the sleep state. However, the sensor device 2 may not be driven by a battery or may not have the sleep function.

If a preset certain period of time (hereinafter, referred to as a sleep time) elapses after the sensor device 2 transitions to the sleep state, the sensor device 2 returns from the sleep state and transmits a wakeup notification to the network camera 1. Then, if the sensor device 2 receives an instruction to transition to the sleep state from the network camera 1, or if a certain period of time elapses without communication, the sensor device 2 transitions to the sleep state again. The sleep time to be set in the sensor device 2 may be set to, for example, an hour or more by default to reduce the battery power consumption.

A condition for cancelling the sleep state may vary depending on the type of the sensor device 2. For example, the sensor device 2 that detects an opened/closed state of a door may cancel the sleep state upon detecting opening/closing of the door, and transmit a detection result of door opening/closing to a master unit. The sensor device 2 serving as a temperature sensor may cancel the sleep state when an amount of change in temperature exceeds a fixed value and at regular time intervals to transmit the current temperature to a master unit.

The network camera 1 has a function of transmitting various types of control commands such as a setting change command to the sensor device 2 via the wireless network 4. However, the sensor device 2 cannot receive or respond to the control commands while being in the sleep state. For this reason, if a control command is generated while the sensor device 2 is in the sleep state, the network camera 1 may store the generated control command thereinside. If the network camera 1 receives a wakeup notification from the sensor device 2, the network camera 1 collectively transmits control commands stored thereinside to the sensor device 2.

Hardware Configuration and Functional Configuration of Communication Apparatus

Figure 2:
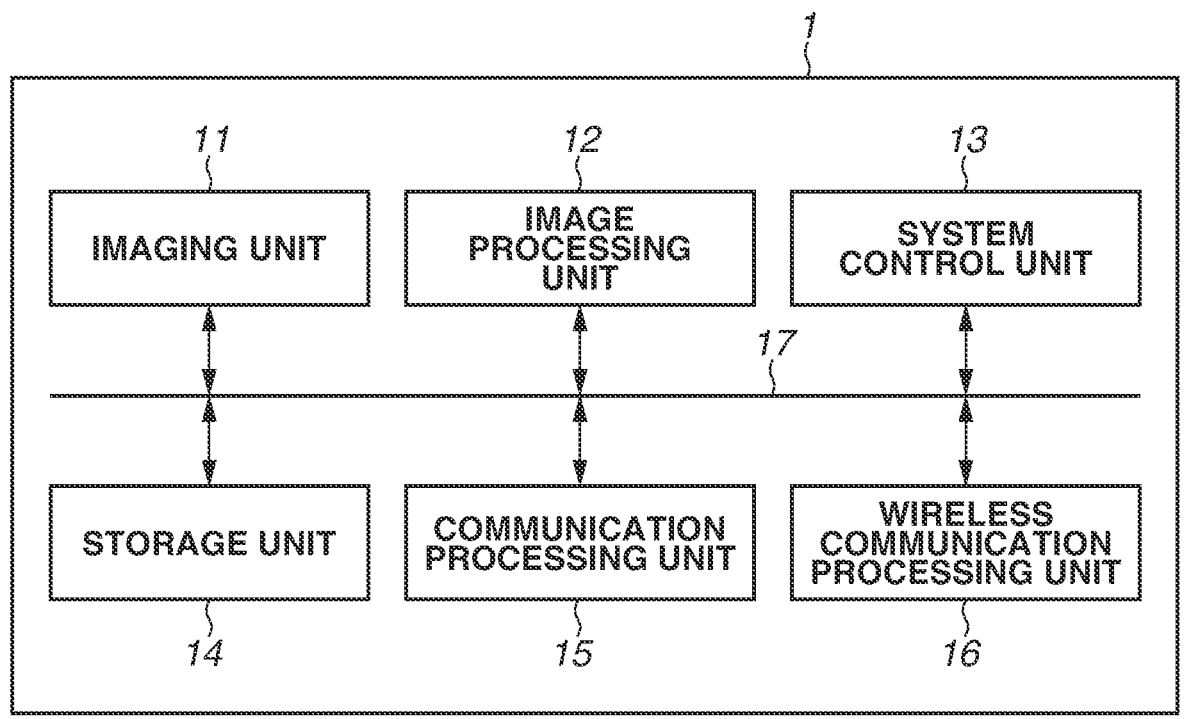
FIG. 2 is a block diagram illustrating an example of a hardware configuration and a functional configuration of a communication apparatus included in a network illustrated in FIG. 1.

FIG. 2 is a diagram illustrating an example of a hardware configuration and a functional configuration of the network camera 1 operating as a master unit on the wireless network 4 and being included in the network camera system according to the present exemplary embodiment.

Among functional modules of the network camera 1 illustrated in FIG. 2, a function to be implemented by software is implemented by a central processing unit (CPU) loading a program for providing a function of each functional module that is stored in a memory such as a read-only memory (ROM), into a random access memory (RAM), and executing the program. A function to be implemented by hardware can be implemented by automatically generating a dedicated communication circuit on a field programmable gate array (FPGA) from a program for providing a function of each functional module using a predetermined compiler, for example. The function may be implemented as hardware by forming a gate array circuit in the same way as the FPGA. Alternatively, the function may be implemented by an application specific integrated circuit (ASIC). The configuration of functional blocks illustrated in FIG. 2 is an example. A plurality of functional blocks may constitute one functional block, or a certain functional block may be divided into blocks that perform a plurality of functions.

The network camera 1 includes an imaging unit 11, an image processing unit 12, a system control unit 13, a storage unit 14, a communication processing unit 15, and a wireless communication processing unit 16. The imaging unit 11, the image processing unit 12, the system control unit 13, the storage unit 14, the communication processing unit 15, and the wireless communication processing unit 16 are connected with each other via a system bus 17. The configuration of the network camera 1 illustrated in FIG. 2 is an example. The network camera 1 may include only a part of the configuration illustrated in FIG. 2 or may also include a configuration other than the configuration illustrated in FIG. 2.

The imaging unit 11 includes a lens unit and an image sensor, and executes image capturing of a subject and conversion of a captured image into an electrical signal. Light from a subject is projected onto the image sensor through the lens unit, and the image sensor converts a projected image into an electrical signal and supplies the electrical signal to the image processing unit 12.

The image processing unit 12 executes image processing and compression coding processing on the electrical signal supplied from the imaging unit 11, and generates image data.

The system control unit 13 includes one or more processors such as a CPU and a micro processing unit (MPU). By executing a program stored in the storage unit 14 or by cooperation between a program and an operating system (OS), the system control unit 13 controls the entire network camera 1.

The system control unit 13 analyzes a camera control command transmitted to the network camera 1, and executes processing based on the analyzed command. The system control unit 13 also detects a change of a parameter in the network camera 1, and executes various types of processing being triggered by a detected event.

The storage unit 14 includes one or more memories including at least one of a ROM or a RAM, and stores programs for executing various types of operations. Furthermore, a storage medium such as a flexible disk, a hard disk drive (HDD), a flash memory, or a detachable secure digital (SD) card may be used as the storage unit 14.

The storage unit 14 stores setting values (setting information) including camera control parameters for image quality control such as an aperture value and a shutter speed, camera control parameters for controlling angle of view such as default setting values, and network parameters such as an internet protocol (IP) address. The storage unit 14 includes a nonvolatile memory that enables a previously-set setting value to be used for start-up when the network camera 1 restarts.

The communication processing unit 15 executes various types of processing regarding network communication performed through a wired LAN or a wireless LAN.

The wireless communication processing unit 16 executes various types of processing regarding wireless communication performed between the network camera 1 and the sensor devices 2 via the wireless network 4.

Inclusion Processing of Slave Unit that is Performed by Communication Apparatus

Figure 3:
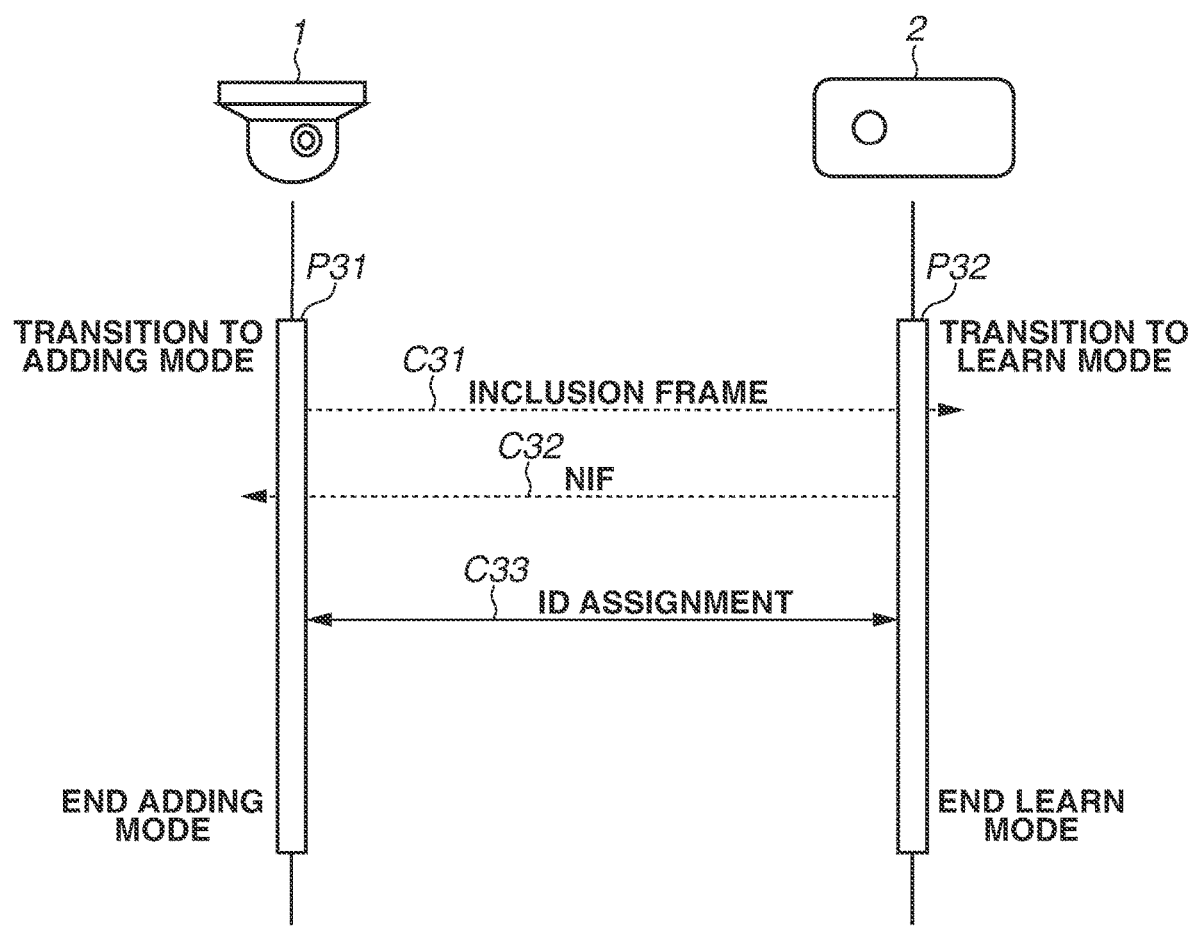
FIG. 3 is a diagram illustrating an example of a processing sequence of processing for including a slave unit.

Hereinafter, an example of a processing sequence of inclusion processing performed between the network camera 1 and the sensor device 2 in conformity to the Z-Wave® will be described with reference to FIG. 3 using as an example of processing in which the network camera 1 registers the sensor device 2 in the wireless network 4. In FIG. 3, a broken-line arrow indicates a broadcast message, and a solid-line arrow indicates a message transmitted by unicast.

At P31, the network camera 1 serving as a master unit transitions to an adding mode by a user operation performed via a Web user interface (UI), for example. While operating in the adding mode, the network camera 1 periodically broadcasts a Z-Wave® frame for inclusion (hereinafter, referred to as an inclusion frame) (C31) to the wireless network 4. The broadcast inclusion frame (C31) includes a Home ID and a Node ID of the network camera 1 based on the Z-Wave®. The Home ID is an ID unique to the wireless network 4, and a common Home ID is assigned to all Z-Wave® devices connecting to the wireless network 4. The Node ID is an ID used for uniquely identifying a Z-Wave® device in the wireless network 4, and a unique value is assigned to each of the devices in the wireless network 4.

On the other hand, at P32, the sensor device 2 serving as a slave unit transitions to a learn mode by a button operation of the sensor device 2. The learn mode is a mode in which a Z-Wave® device can be registered (included) in the wireless network 4 as a slave unit or deregistered (excluded) from the wireless network 4.

More specifically, while operating in the learn mode, the sensor device 2 periodically broadcasts a Node Information Frame (NIF) (C32) to the wireless network 4. The NIF is a Z-Wave® frame used for transmitting information regarding a Z-Wave® device, and includes information such as the Home ID and the Node ID of the device and a corresponding Z-Wave command set.

The sensor device 2 broadcasts the NIF (C32) to the wireless network 4 while operating in the learn mode or when receiving a NIF transmission request from the master unit. The NIF (C32) includes, as identification information of the sensor device 2, values of the Home ID and the Node ID that are assigned before the sensor device 2 is included by the master unit and belongs to the wireless network 4.

When the network camera 1 receives and checks the NIF (C32) from the sensor device 2, the network camera 1 transmits, by unicast, a Z-Wave frame (C33) for assigning the Home ID and the Node ID (hereinafter, simply referred to as IDs) to the sensor device 2. When the IDs are normally assigned to the sensor device 2, the network camera 1 ends the adding mode, and the sensor device 2 ends the learn mode. Thus, the inclusion processing ends.

Figure 4:
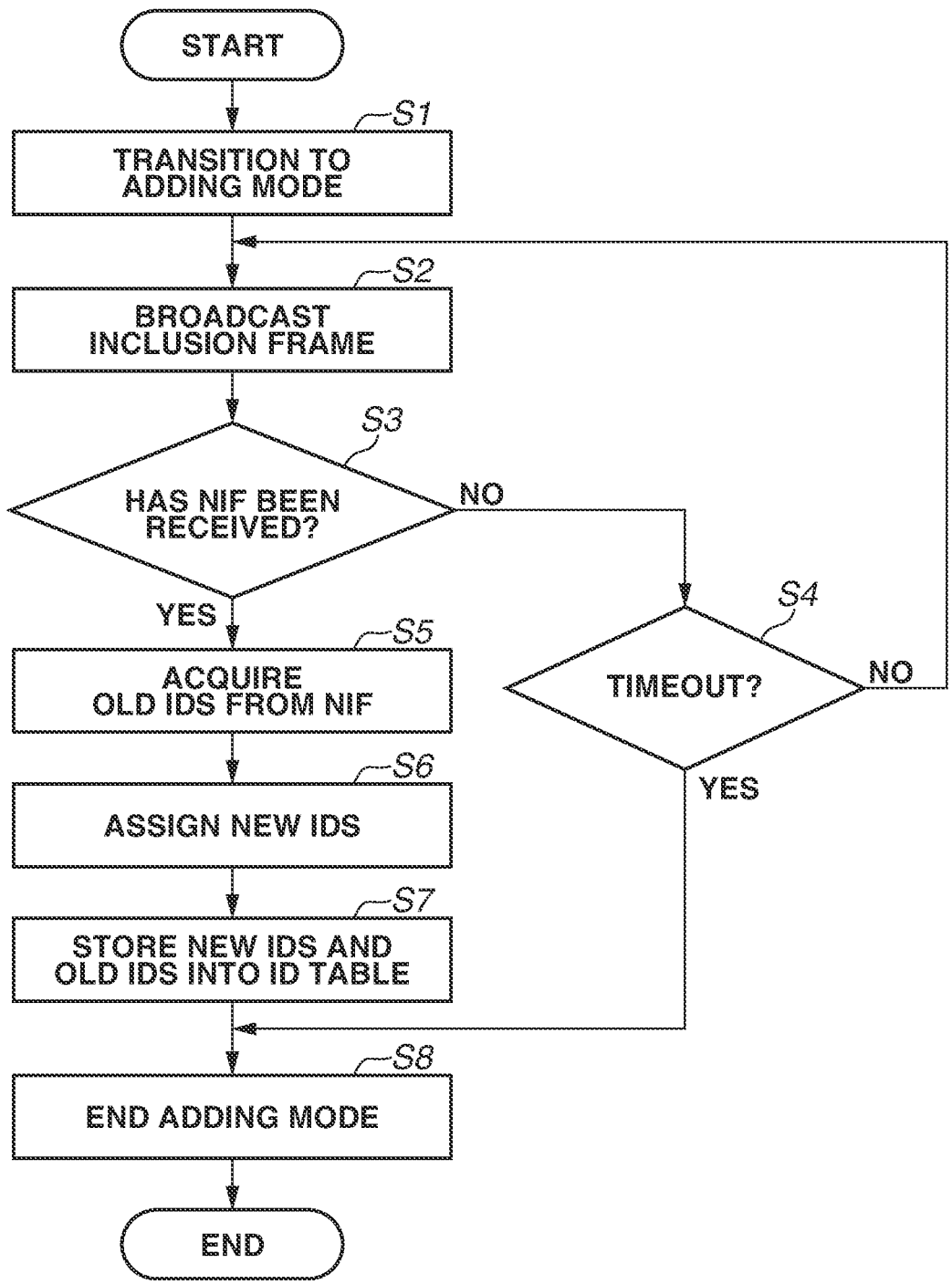
FIG. 4 is a flowchart illustrating an example of a processing procedure of processing for including a slave unit that is executed by the communication apparatus according to the present exemplary embodiment.

FIG. 4 is a flowchart illustrating an example of a processing procedure of internal processing executed by the network camera 1 that executes the inclusion processing sequence illustrated in FIG. 3.

The processing illustrated in FIG. 4 is started when the user presses a button of the network camera 1, for example. However, a start timing of the processing illustrated in FIG. 4 is not limited to the above-described timing, and the processing may be started, for example, by the user inputting a processing start instruction via an operation unit of the network camera 1 or by remotely operating the network camera 1. The network camera 1 can execute the processing illustrated in FIG. 4 by allowing the system control unit 13 to read a necessary program from the storage unit 14 and executing the program.

Alternatively, the processing illustrated in FIG. 4 can be implemented by at least part of the components illustrated in FIG. 2 operating as dedicated hardware. In such a case, the dedicated hardware operates under control by the system control unit 13.

In step S1, the network camera 1 transitions to the adding mode in response to a button operation of the user, and stays in the adding mode for a certain period of time. In step S2, the network camera 1 broadcasts an inclusion frame to the wireless network 4.

In step S3, the network camera 1 determines whether a NIF has been received from another Z-Wave® device. If the NIF has not been received (NO in step S3), the processing proceeds to step S4. In step S4, the network camera 1 determines whether a timeout has occurred.

If it is determined in step S4 that a certain period of time has elapsed from when the network camera 1 transitions to the adding mode (YES in step S4), it is determined that the timeout has occurred, and the processing proceeds to step S8. In step S8, the network camera 1 ends the adding mode. If it is determined in step S4 that the timeout has not occurred yet (NO in step S4), the processing returns to step S2, and broadcasting of an inclusion frame is periodically repeated.

Referring back to step S3, if it is determined that the NIF has been received (YES in step S3), the processing proceeds to step S5.

In step S5, the network camera 1 extracts, from the received NIF, a Home ID and a Node ID of the sensor device 2 that are assigned before inclusion. The Home ID and the Node ID that are assigned before the inclusion and extracted from the NIF in step S5 will be hereinafter referred to as an old Home ID and an old Node ID, respectively. Both of the IDs will also be collectively referred to as old IDs.

It is defined that a Z-Wave® device has a unique value as the Home ID and an arbitrary value as the Node ID in a state of not belonging to the wireless network 4.

In step S6, the network camera 1 newly assigns a Home ID and a Node ID to the sensor device 2. The Home ID and the Node ID that are assigned to the sensor device 2 in step S6 will be hereinafter referred to as a new Home ID and a new Node ID, respectively. Both of the IDs will also be collectively referred to as new IDs.

More specifically, the network camera 1 assigns an ID common to all devices in the wireless network 4 to the sensor device 2 as the new Home ID, and a unique ID in the wireless network 4 to the sensor device 2 as the new Node ID.

In step S7, the network camera 1 stores, in an ID table in the storage unit 14, the old Home ID and the old Node ID of the sensor device 2 that have been acquired in step S5, and the new Home ID and the new Node ID that have been assigned in step S6, in association with each other. The ID table generated and managed by the network camera 1 according to the present exemplary embodiment is a table storing the old IDs and the new IDs in association with each other. The ID table will be described below with reference to FIG. 5.

In step S8, the network camera 1 ends the adding mode.

FIG. 5 illustrates an example of the ID table generated and managed by the network camera 1.

An ID table 50 is a table used by the network camera 1 to store the old IDs and the new IDs in the storage unit 14 in association with each other. The new IDs are identification information (new Home ID and new Node ID) assigned by the network camera 1 to a Z-Wave® device belonging to the wireless network 4. The old IDs are identification information (old Home ID and old Node ID) held before each device is included in the wireless network 4.

In the present exemplary embodiment, the ID table 50 is referred to by the network camera 1 to warn the user about an unauthorized operation of the sensor device 2 that is performed by a third party. For example, a warning about unpermitted exclusion performed without involving the network camera 1 is given. The details of warning processing of unauthorized exclusion will be described below with reference to FIG. 10. The unauthorized operation performed by the third party includes an operation of enabling exclusion of the sensor device 2 such as a transition operation to the learn mode in addition to the unauthorized exclusion of the sensor device 2.

Entries in the ID table 50 include a Home ID 51, a Node ID 52, an old Home ID 53, and an old Node ID 54.

The Home ID 51 and the Node ID 52 are new IDs assigned when the sensor device 2 is included by the network camera 1. On the other hand, the old Home ID 53 and the old Node ID 54 are old IDs held by the sensor device 2 before the inclusion, i.e., the old IDs acquired from the NIF (C31) received in response to the initial inclusion frame (C31).

Entries of the included sensor device 2 are added to the ID table 50 when the network camera 1 executes the inclusion processing, and the entries of the sensor device 2 are deleted when the network camera 1 executes the exclusion processing.

The ID table 50 is held even after the network camera 1 restarts. Thus, the ID table 50 is stored in a nonvolatile storage region of the storage unit 14 of the network camera 1.

Exclusion Processing of Slave Unit that is Performed by Communication Apparatus Hereinafter, an example of a processing sequence of exclusion processing performed between the network camera 1 and the sensor device 2 in conformity to the Z-Wave® will be described with reference to FIG. 6 using, as an example, processing in which the network camera 1 deregisters the sensor device 2 from the wireless network 4. Similarly to FIG. 3, in FIG. 6, a broken-line arrow indicates a broadcast message, and a solid-line arrow indicates a message transmitted by unicast.

At P61, the network camera 1 serving as a master unit transitions to an exclusion mode by a user operation performed via a Web UI, for example. While operating in the exclusion mode, the network camera 1 periodically broadcasts a Z-Wave® frame for exclusion (hereinafter, referred to as an exclusion frame) (C61) to the wireless network 4.

Similarly to the inclusion frame, the broadcast exclusion frame (C61) includes a Home ID and a Node ID of the network camera 1 based on the Z-Wave®.

On the other hand, at P62, the sensor device 2 serving as a slave unit transitions to the learn mode by a button operation, similarly to the case of inclusion. While operating in the learn mode, the sensor device 2 periodically broadcasts the NIF (C32) to the wireless network 4.

Figure 6:
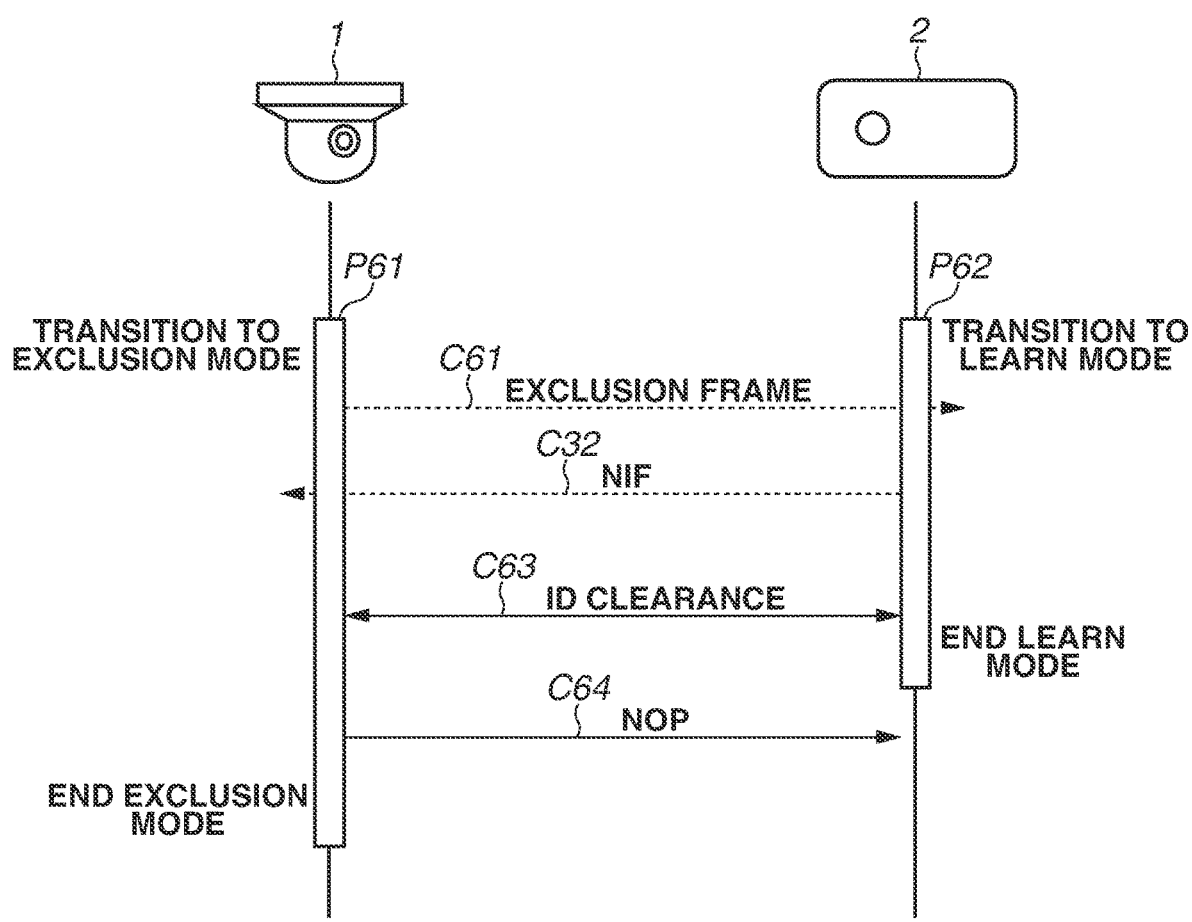
FIG. 6 is a diagram illustrating an example of a processing sequence of processing for excluding a slave unit.

The NIF (C32) illustrated in FIG. 6 includes values of the Home ID and the Node ID that are assigned by the network camera 1 serving as a master unit when the sensor device 2 is included by the master unit and belongs to the wireless network 4.

If the network camera 1 receives and checks the NIF (C32) from the sensor device 2, the network camera 1 transmits, by unicast, a Z-Wave frame (C63) for clearing the IDs (Home ID and Node ID) assigned to the sensor device 2.

When the clearance of the IDs assigned to the sensor device 2 is completed, the network camera 1 transmits, by unicast, a No Operation (NOP) command (C64) to the sensor device 2 a plurality of times, and confirms that there is no response from the sensor device 2. The NOP command is transmitted for confirming that wireless communication with the sensor device 2 via the wireless network 4 has been normally disconnected. After it is confirmed that there is no response (Ack) to the NOP command, the network camera 1 ends the exclusion mode, and the sensor device 2 ends the learn mode. Thus, the exclusion processing ends.

Figure 7:
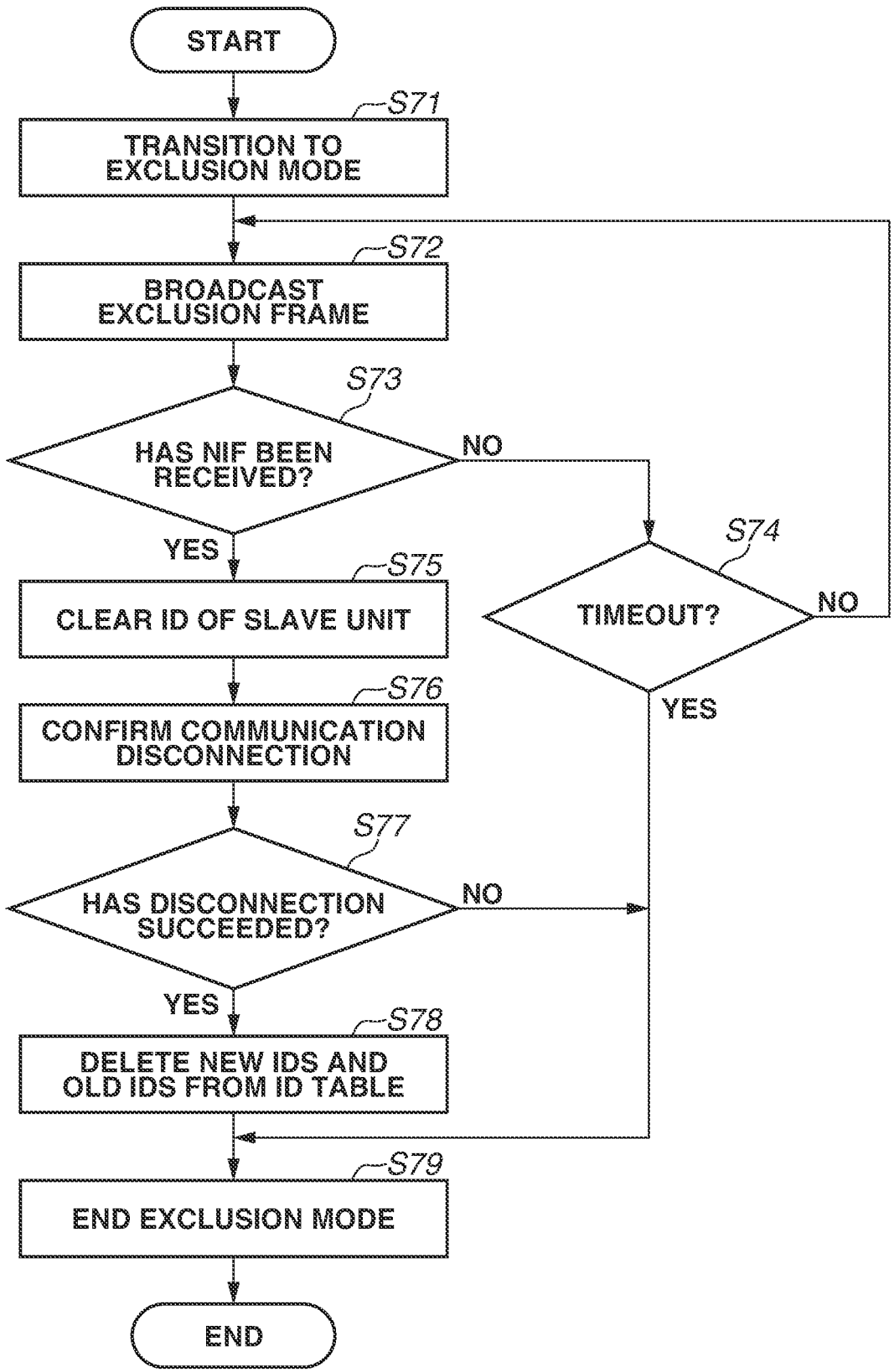
FIG. 7 is a flowchart illustrating an example of a processing procedure of processing for excluding a slave unit that is executed by the communication apparatus according to the present exemplary embodiment.

FIG. 7 is a flowchart illustrating an example of a processing procedure of internal processing executed by the network camera 1 that executes the exclusion processing sequence illustrated in FIG. 6.

In step S71, the network camera 1 transitions to the exclusion mode in response to a user operation. In step S72, the network camera 1 broadcasts an exclusion frame to the wireless network 4.

In step S73, the network camera 1 determines whether a NIF has been received from another Z-Wave® device. If the NIF has not been received (NO in step S73), the processing proceeds to step S74. In step S74, the network camera 1 determines whether a timeout has occurred.

If it is determined in step S74 that a certain period of time has elapsed from when the network camera 1 transitions to the exclusion mode (YES in step S74), it is determined that the timeout has occurred, and the processing proceeds to step S79. In step S79, the network camera 1 ends the exclusion mode. On the other hand, if it is determined in step S74 that the timeout has not occurred (NO in step S74), the processing returns to step S72, and broadcasting of an exclusion frame is periodically repeated.

Referring back to step S73, if the NIF has been received (YES in step S73), the processing proceeds to step S75.

In step S75, the network camera 1 clears the IDs (Home ID and Node ID) of the sensor device 2 being a transmission source of the NIF.

In step S76, the network camera 1 confirms that the wireless communication with the sensor device 2 has been normally disconnected, for example, by transmitting an NOP to the sensor device 2 and confirming that there is no response from the sensor device 2.

In step S77, the network camera 1 determines whether disconnection of the communication has succeeded. If the response (Ack) to the NOP transmitted in step S76 is returned, it is determined that the disconnection of the communication has failed (NO in step S77), and the processing proceeds to step S79. In step S79, the network camera 1 ends the exclusion mode. On the other hand, if no response (Ack) to the NOP transmitted in step S76 is returned, it is determined that the disconnection of the communication has succeeded (YES in step S77), and the processing proceeds to step S78.

In step S78, the network camera 1 deletes the entries of the new IDs and the old IDs of the sensor device 2 (the Home ID 51, the Node ID 52, the old Home ID 53, and the old Node ID 54) from the ID table 50.

In step S79, the network camera 1 ends the exclusion mode.

Figure 8:
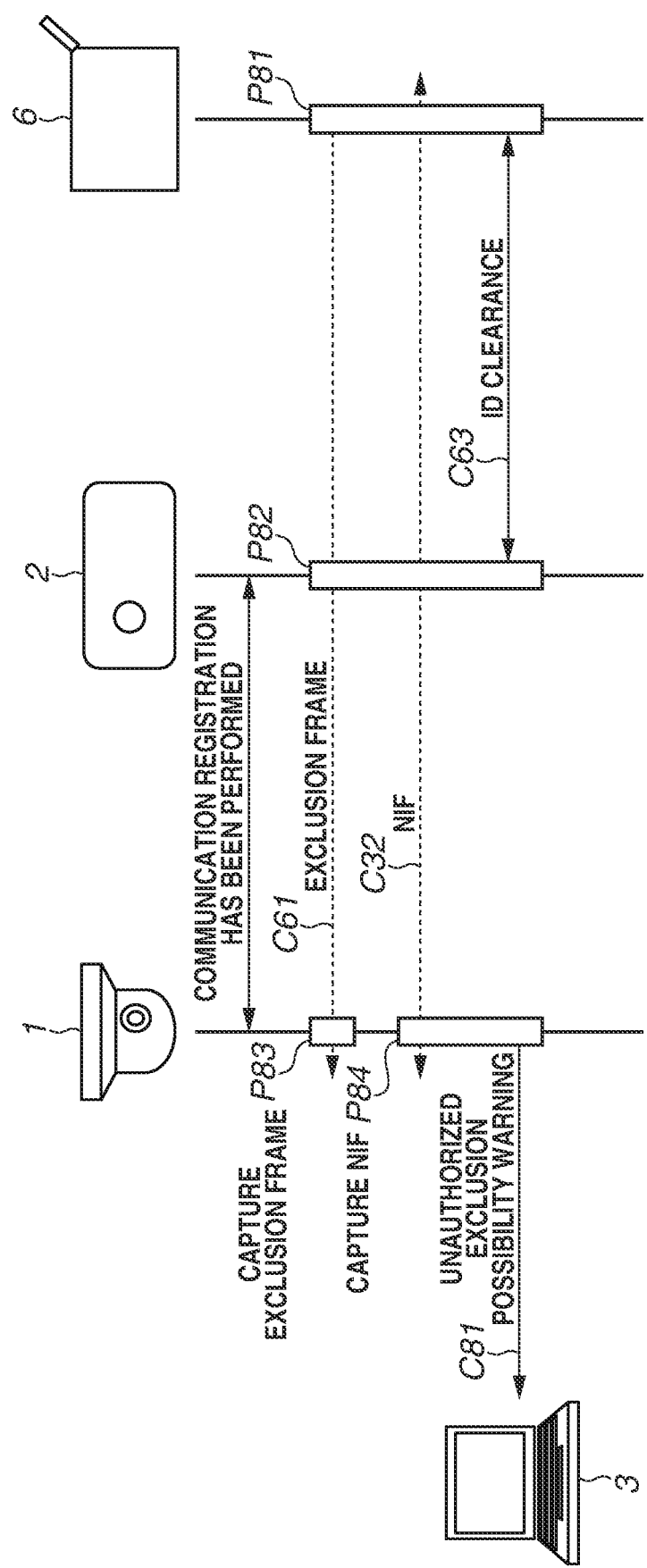
FIG. 8 is a diagram illustrating an example of a processing sequence of processing for forecasting occurrence of unauthorized exclusion to be performed by an external device in the present exemplary embodiment.

Warning Processing of Unauthorized Operation Performed by External Device in Communication Apparatus FIG. 8 is a diagram illustrating a behavior of the network camera 1 that is performed when the external controller device 6 excludes the sensor device 2, as an example of unauthorized Z-Wave® connection control performed on the sensor device 2 by the external controller device 6.

In general, the exclusion is executed between devices of which communication has been registered. However, in the Z-Wave®, a Z-Wave® controller device of which communication has not been registered is also permitted to execute exclusion of a slave unit on behalf of a master unit.

In FIG. 8, the network camera 1 has already included the sensor device 2 in the wireless network 4, and registration of communication has been completed.

At P81, the external controller device 6 transitions to the exclusion mode and broadcasts the exclusion frame (C61) to the wireless network 4.

At P82, the sensor device 2 transitions to the learn mode by a button operation performed by a third party other than the user of the system.

The external controller device 6 and the sensor device 2 interchange the exclusion frame (C61) and the NIF (C32). Then, the external controller device 6 transmits, to the sensor device 2, the Z-Wave® frame (C63) for clearing the IDs of the sensor device 2.

Through the above-described sequence, the wireless communication between the network camera 1 and the sensor device 2 is disconnected, and the sensor device 2 leaves the wireless network 4.

However, since the network camera 1 is not involved in the above-described exclusion sequence, normally, the network camera 1 cannot detect such an event that the sensor device 2 has left the wireless network 4. In addition, since the sensor device 2 is normally in the sleep state, existence of the sensor device 2 cannot be checked by transmitting a command from the network camera 1 to the sensor device 2.

In view of the foregoing, in the present exemplary embodiment, the network camera 1 captures the exclusion frame (C61) at P83 and the NIF (C32) at P84 among frames broadcast to the wireless network 4.

By analyzing the information captured at P83 and P84, the network camera 1 generates a warning message for forecasting that unauthorized exclusion of the sensor device 2 is highly likely to be performed by an external device, and outputs the warning message to the information terminal 3.

More specifically, the network camera 1 checks IDs included in the NIF captured at P84 against new IDs registered in the ID table 50, and determines that a transmission source of the NIF (C32) is a slave unit included by the network camera 1.

The network camera 1 further determines that the NIF (C32) transmitted from the sensor device 2 of which communication has been registered is not a NIF transmitted in response to a request from the network camera 1, and determines that the network camera 1 is not in the exclusion mode.

The network camera 1 further determines that the exclusion frame (C61) captured at P83 is broadcast at a time close to a time at which the NIF captured at P84 is broadcast. Order of reception of the exclusion frame (C61) and the NIF (C32) may be a reverse order.

Based on the above-described analysis result, the network camera 1 can determine that there is a possibility of the sensor device 2 being excluded by the external controller device 6 as a result of unauthorized operation performed on the sensor device 2. In this case, the network camera 1 generates a warning message (C81) for forecasting the possibility of the unauthorized exclusion to be performed on the sensor device 2, transmits the warning message (C81) to the information terminal 3 via the network 5, and outputs the warning message (C81) to a display device of the information terminal 3.

Figure 9:
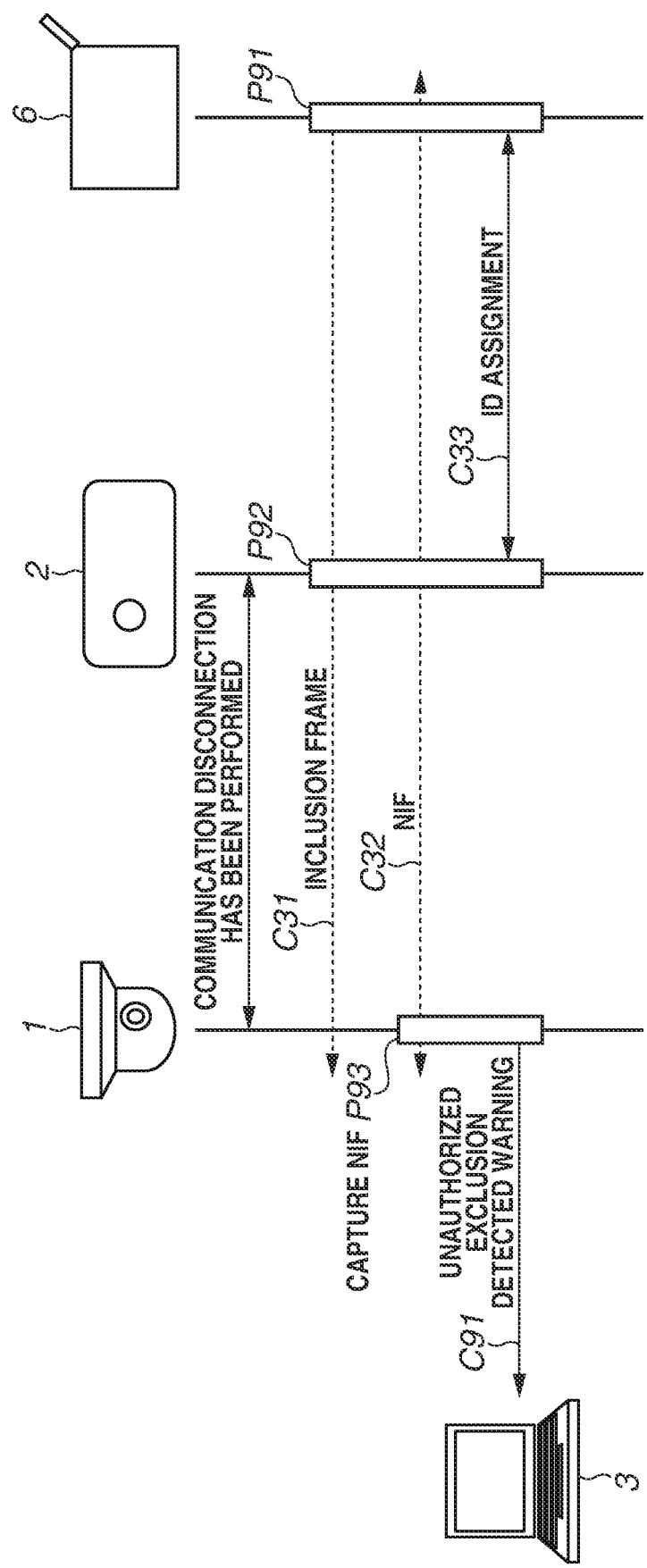
FIG. 9 is a diagram illustrating an example of a processing sequence of processing for giving a warning against occurrence of unauthorized exclusion executed by an external device in the present exemplary embodiment.

FIG. 9 is a diagram illustrating a behavior of the network camera 1 that is performed when inclusion is performed after the external controller device 6 excludes the sensor device 2, as another example of unauthorized Z-Wave® connection control performed by the external controller device 6.

In FIG. 9, the wireless communication between the network camera 1 and the sensor device 2 via the wireless network 4 has already been disconnected.

At P91, the external controller device 6 transitions to the adding mode and broadcasts the inclusion frame (C31) to the wireless network 4.

At P92, the sensor device 2 transitions to the learn mode again by a button operation performed by a third party other than the user of the system.

The external controller device 6 and the sensor device 2 interchange the inclusion frame (C31) and the NIF (C32). Then, the external controller device 6 transmits, to the sensor device 2, the Z-Wave® frame (C33) for newly assigning IDs to the sensor device 2.

In the present exemplary embodiment, at P93, the network camera 1 captures the NIF (C32) broadcast by the sensor device 2 among frames broadcast to the wireless network 4.

By analyzing the information captured at P93, the network camera 1 generates a warning message indicating that unauthorized exclusion of the sensor device 2 performed by an external device has been detected, and outputs the warning message to the information terminal 3.

More specifically, the network camera 1 checks ID information included in the NIF captured at P93 against the old IDs (the old Home ID 53 and the old Node ID 54) registered in the ID table 50. If the ID table 50 includes an old ID corresponding to an ID included in the NIF captured at P93, the network camera 1 determines that a transmission source of the NIF (C32) is a slave unit of which communication has been registered (included) by the network camera 1.

Based on the above-described analysis result, the network camera 1 can determine that unauthorized operation has been performed on the sensor device 2, and that the sensor device 2 has already been excluded by an external device, and further, is to be included by the external device. In such a case, the network camera 1 generates a warning message (C91) indicating that unauthorized exclusion of the sensor device 2 has been detected, transmits the warning message (C91) to the information terminal 3 via the network 5, and outputs the warning message (C91) to a display device of the information terminal 3.

Figure 10:
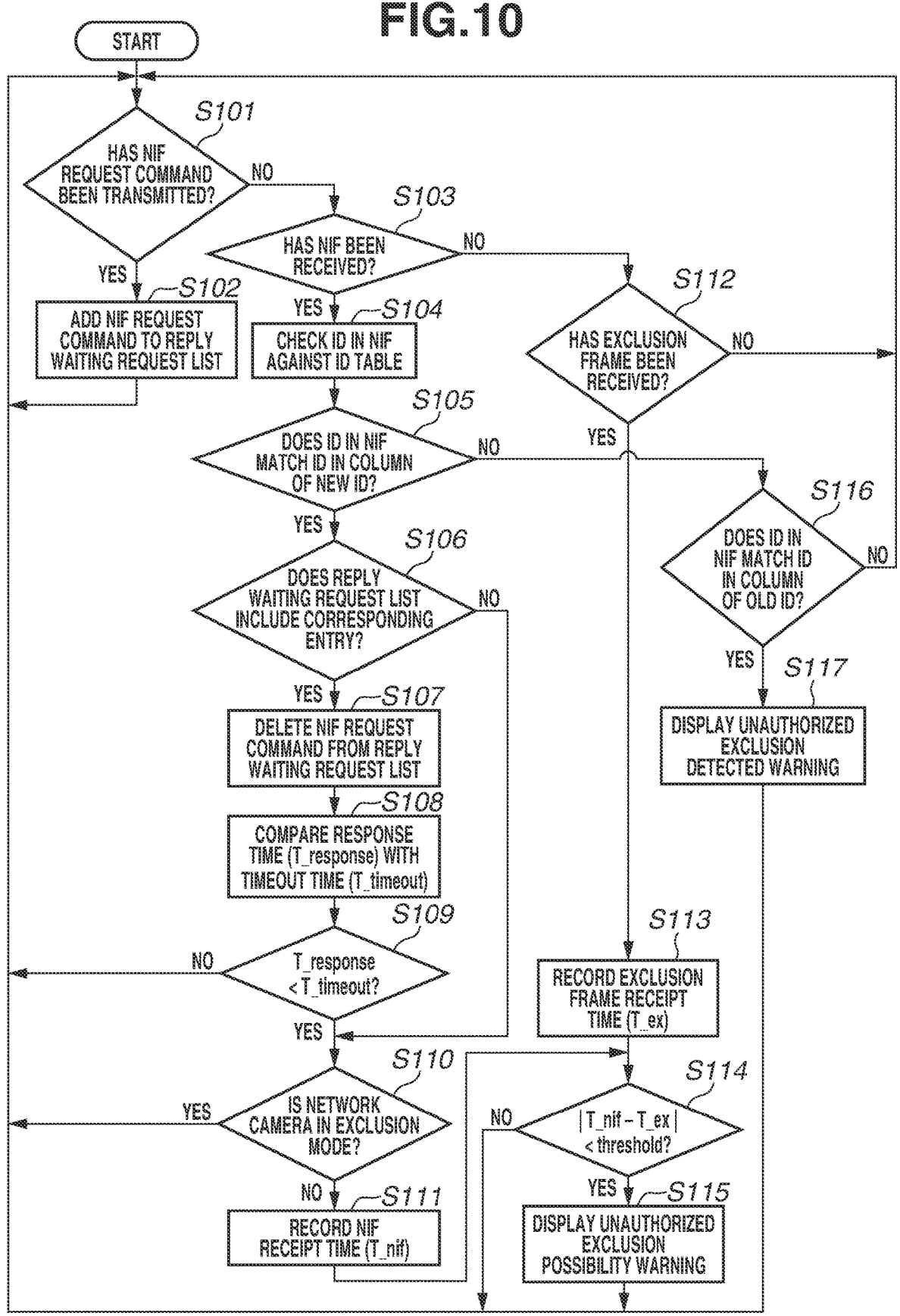
FIG. 10 is a flowchart illustrating an example of a processing procedure of processing for forecasting and warning about occurrence of unauthorized exclusion to be performed by an external device on the communication apparatus executing the processing sequences illustrated in FIGS. 8 and 9.

Processing Procedure of Warning Processing of Unauthorized Operation Performed by External Device that is Executed by Communication Apparatus FIG. 10 is a flowchart illustrating an example of a processing procedure of internal processing executed by the network camera 1 when an unauthorized operation (e.g., exclusion and inclusion) is performed on the sensor device 2 by the external controller device 6 as illustrated in FIGS. 8 and 9.

In step S101, the network camera 1 determines whether a command for requesting broadcasting of a NIF (hereinafter, referred to as a NIF request command) has been transmitted to the sensor device 2.

The NIF request command is transmitted being triggered by a user operation. If the sensor device 2 receives the NIF request command, the sensor device 2 broadcasts a NIF to the wireless network 4.

If a NIF request command has been transmitted (YES in step S101), the processing proceeds to step S102. In step S102, the network camera 1 records the NIF request command in a reply waiting request list together with a transmission time of the NIF request command. The reply waiting request list is a list held in the system control unit 13, and is a list for recording a command which has been transmitted by the network camera 1 to the sensor device 2 and to which a response has not been returned.

Steps S101 and S102 described above are required for determining whether a NIF transmitted from the sensor device 2 is a NIF transmitted in response to a NIF request command or a NIF transmitted upon the sensor device 2 transitioning to the learn mode.

If the NIF request command has not been transmitted (NO in step S101), the processing proceeds to step S103. In step S103, the network camera 1 determines whether a NIF has been received. If the NIF has been received (YES in step S103), the processing proceeds to step S104.

In step S104, the network camera 1 checks IDs included in the NIF against the ID table 50, and determines whether a transmission source of the received NIF is a slave unit being in a communication registration state with the network camera 1, i.e., whether the transmission source is an included slave unit.

In step S105, the network camera 1 analyzes a check result obtained in step S104, and if an ID included in the NIF received in step S103 matches an ID in columns of new IDs in the ID table 50 (YES in step S105), the processing proceeds to step S106. In step S106 and subsequent steps, a possibility that a slave unit currently being in the communication registration state is operated in an unauthorized manner is additionally analyzed.

In step S106, the network camera 1 determines whether the reply waiting request list recorded in step S102 includes a NIF request command. If the reply waiting request list includes an entry of the NIF request command corresponding to the NIF received in step S103 (YES in step S106), the processing proceeds to step S107. In step S107, the network camera 1 deletes the corresponding NIF request command from the reply waiting request list. If the reply waiting request list does not include an entry of the NIF request command corresponding to the NIF received in step S103 (NO in step S106), the processing proceeds to step S110 by skipping steps S107 to S109.

In step S108, the network camera 1 determines whether the NIF request command has already timed out. More specifically, the network camera 1 compares a response time (T_response) that is a period of time from a request for the NIF to the reception with a timeout time (T_timeout). The T_timeout is a period of time after which a response to a command is considered to have timed out. In this example, the T_timeout is set to 10 seconds, but an arbitrary value can be set.

In step S109, the network camera 1 determines whether the response time (T_response) is greater than or equal to the timeout time (T_timeout), i.e., whether a timeout has occurred. If it is determined that the timeout has occurred (NO in step S109), it is determined that the received NIF is not a response to a NIF request command, and the processing returns to step S101. If the response time (T_response) is less than the timeout time (T_timeout), i.e., the timeout has not occurred (YES in step S109), the processing proceeds to step S110. In step S110, the network camera 1 determines whether the network camera 1 is in the exclusion mode.

If the network camera 1 is in the exclusion mode (YES in step S110), it is considered that the user has performed an operation with an intention to exclude the sensor device 2. Thus, it is determined that the operation is not an unauthorized operation, and the processing returns to step S101.

If the network camera 1 is not in the exclusion mode (NO in step S110), it is determined that the sensor device 2 is possibly operated in an unauthorized manner, and the processing proceeds to step S111.

In step S111, the network camera 1 temporarily records a time of receipt (T_nif) of the NIF into the storage unit 14, and executes determination processing for detecting a sign of unauthorized exclusion. The determination processing will be described below in the description of step S114.

Referring back to step S103, if the NIF has not been received (NO in step S103), the processing proceeds to step S112. In step S112, the network camera 1 determines whether an exclusion frame has been received from the wireless network 4. If the exclusion frame has not been received (NO in step S112), the processing returns to step S101, and the processing is repeated. If the exclusion frame has been received (YES in step S112), the processing proceeds to step S113. In step S113, the network camera 1 records a time of receipt (T_ex) of the exclusion frame received in step S112, and the processing proceeds to step S114.

In step S114, the network camera 1 executes the determination processing for detecting a sign of unauthorized exclusion performed by an external device. In step S114, the network camera 1 compares the time of receipt (T_nif) of the NIF recorded in step S111 with the time of receipt (T_ex) of the exclusion frame recorded in step S113. If the time of receipt of the NIF and the time of receipt of the exclusion frame are apart by a time less than a threshold and are sufficiently close to each other (YES in step S114), there is a high possibility that unauthorized exclusion will be performed by an external device. Thus, the processing proceeds to step S115. In step S115, the network camera 1 generates a warning for forecasting possible occurrence of unauthorized exclusion, and transmits the generated warning to the information terminal 3.

The threshold for determining whether the both times of receipt are sufficiently close to each other is set to 30 seconds in this example, but the threshold is not limited to this. The threshold is to be appropriately adjusted considering the timeout time of the exclusion mode set in the Z-Wave®. A specific example of the warning for forecasting the possible occurrence of the unauthorized exclusion that is output to the information terminal 3 in step S115 will be described below with reference to FIG. 11.

The processing in steps S111 to S114 in FIG. 10 may be omitted. In other words, the network camera 1 may generate a preliminary notice or warning about the unauthorized exclusion if the sensor device 2 being a transmission source of a NIF periodically transmits the NIF without involving the network camera 1 even though the sensor device 2 is a slave unit included by the network camera 1.

Referring back to step S105, if the ID included in the NIF received in step S103 does not match any ID in the columns of new IDs in the ID table 50 (NO in step S105), the processing proceeds to step S116. In step S116, the network camera 1 determines whether the ID included in the NIF matches an ID in columns of old IDs in the ID table 50.

If the ID included in the received NIF does not match any ID in the columns of old IDs in the ID table 50 (NO in step S116), the processing returns to step S101, and the processing is repeated.

If the ID included in the received NIF match an ID in the columns of old IDs in the ID table 50 (YES in step S116), it can be determined that the sensor device 2 has already been excluded in an unauthorized manner by an external device. More specifically, it can be determined that the sensor device 2 is shifted to the learn mode by a third party, and the sensor device 2 broadcasts a NIF, so that the external controller device 6 can exclude the sensor device 2 in an unauthorized manner and further include the sensor device 2.

Thus, the processing proceeds to step S117. In step S117, the network camera 1 generates a warning indicating that unauthorized exclusion has been detected for the user, and transmits the generated warning to the information terminal 3.

A specific example of the warning that notifies the user of detection of unauthorized exclusion and that is output to the information terminal 3 in step S117 will be described below with reference to FIG. 12.

Warning Screen Example of Unauthorized Operation

Figure 11:
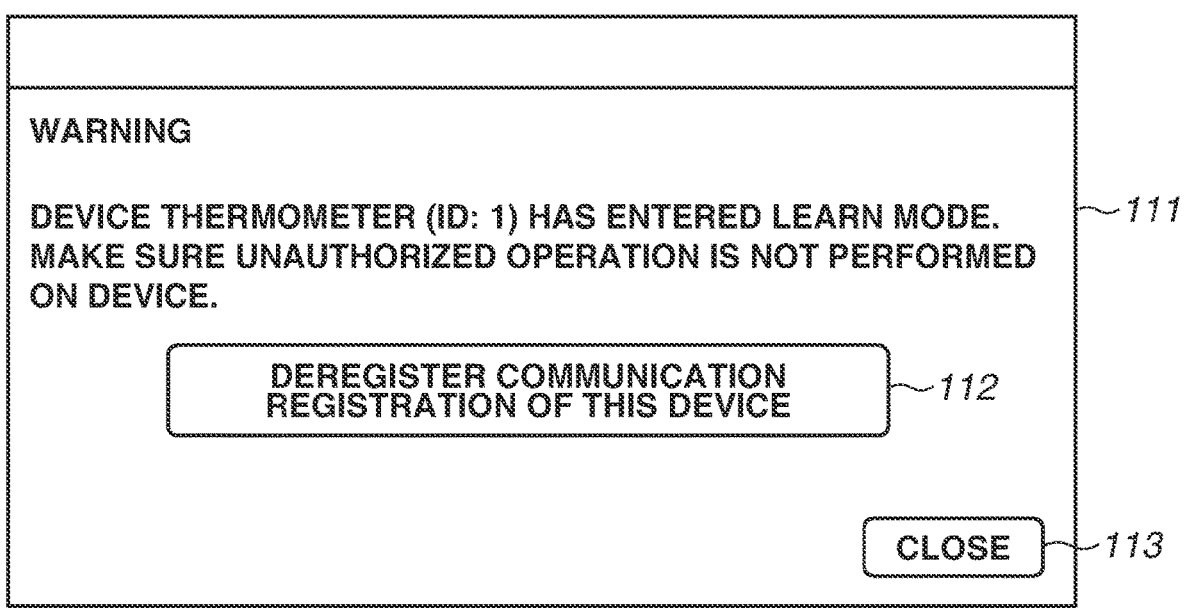
FIG. 11 is a diagram illustrating an example of a warning screen that forecasts occurrence of unauthorized exclusion to be performed by an external device and that is output to an information terminal by the communication apparatus.

FIG. 11 is a diagram illustrating an example of a warning screen to be presented to the user via the information terminal 3 in step S115 of FIG. 10. The warning screen for forecasting occurrence of unauthorized exclusion of the sensor device 2 and providing an interface for an input from the user.

The warning screen illustrated in FIG. 11 includes a warning window 111, a deregistration button 112, and a close button 113. The warning window 111 represents a body of a warning message for forecasting the occurrence of unauthorized exclusion of the sensor device 2, and the warning message and each button are arranged on the window. Each button can be pressed by a mouse click. If each button is pressed, the control of the network camera 1 is switched corresponding to the button.

The deregistration button 112 is a button for excluding, by the network camera 1, a device having a possibility of being operated in an unauthorized manner. If the deregistration button 112 is pressed, the network camera 1 transitions to the exclusion mode. If the close button 113 is pressed, the warning window 111 is closed, and the network camera 1 no longer performs the processing corresponding to the warning window 111.

Figure 12:
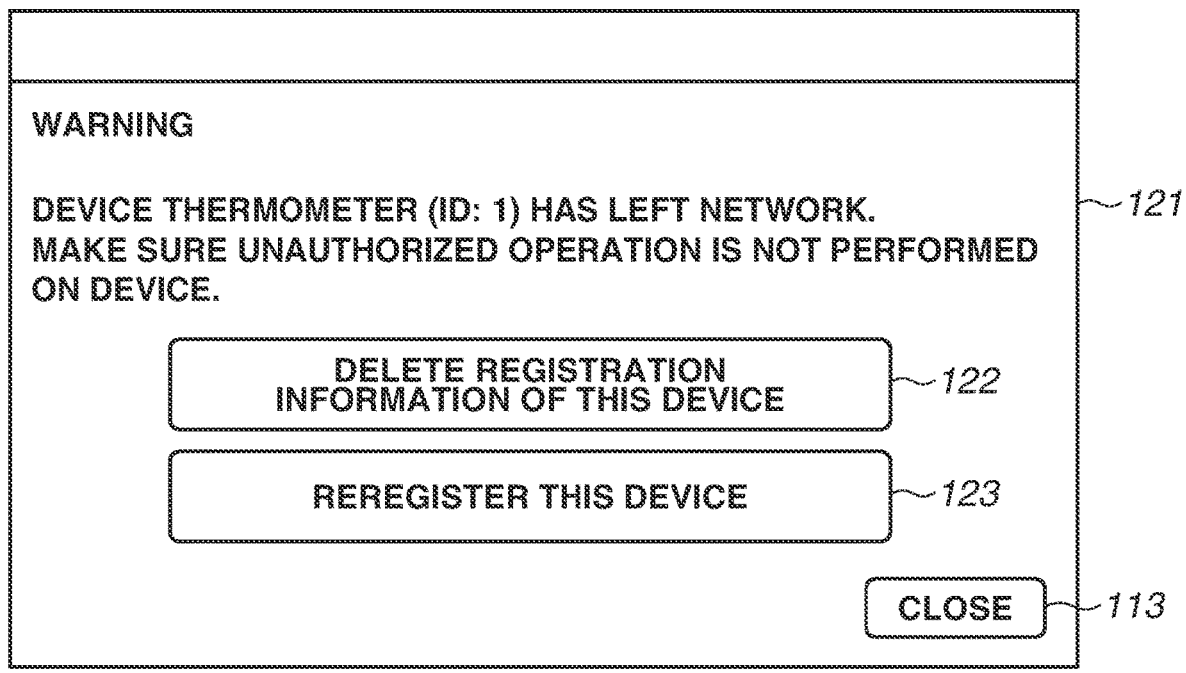
FIG. 12 is a diagram illustrating an example of a warning screen for notifying the user of occurrence of unauthorized exclusion executed by an external device that is output to an information terminal by the communication apparatus.

FIG. 12 is a diagram illustrating an example of a warning screen to be presented to the user via the information terminal 3 in step S117 of FIG. 10. The warning screen notifies the user of the detection of the unauthorized exclusion of the sensor device 2 that has already been performed, and provides an interface for an input from the user.

The warning screen illustrated in FIG. 12 includes a warning window 121, a device deletion button 122, a reregistration button 123, and the close button 113. If the device deletion button 122 is pressed, registration information such as ID information of the sensor device 2 that is stored in the storage unit 14 of the network camera 1 is deleted. The reregistration button 123 is a button for transitioning to a replace mode for replacing the sensor device 2.

The replace mode has a function of including a Z-Wave® device, similarly to the adding mode. However, the same IDs (Home ID and Node ID) as IDs assigned to a device before replacement are assigned to a device to be included. The sensor device 2 can be included again by using the replace mode.

As described above, in the present exemplary embodiment, a communication apparatus captures ID information (NIF) transmitted from a slave unit on a wireless network, and checks the captured ID information against registration information about the slave unit managed by the communication apparatus. Based on a check result, if the slave unit that has transmitted the ID information is a slave unit included by the communication apparatus, the communication apparatus determines that the slave unit has transitioned to a mode in which deregistration can be performed, and generates a warning for forecasting a possibility that the slave unit can be excluded in an unauthorized manner by an external device. Based on the result of checking against the registration information about slave units, the communication apparatus also determines that the slave unit that has transmitted the ID information has transitioned to a mode in which communication registration can be performed, and generates a warning indicating the detection of unauthorized exclusion of the slave unit that has already been performed by an external device.

Accordingly, the communication apparatus can prevent an unauthorized operation to be performed by an external device by detecting an unauthorized operation performed by an external device without involving a master unit and appropriately notifying the user about the detection even if a slave unit of which communication has been registered is in the sleep state.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-089429, filed May 10, 2019, which is hereby incorporated by reference herein in its entirety.

What is claimed is:

1. A communication apparatus comprising:
a registration unit configured to register a slave unit for communication on a wireless network;
a receiving unit configured to receive identification information for identifying the slave unit on the wireless network, the identification information being periodically transmitted from the slave unit to the wireless network;
a detection unit configured to detect, in a case where the slave unit which is a transmission source of the identification information received by the receiving unit is a slave unit that has been registered for communication on the wireless network by the registration unit, an operation performed on the slave unit without involving the communication apparatus; and
an output unit configured to output an alert in a case where the operation is detected by the detection unit.

2. The communication apparatus according to claim 1, wherein the detection unit determines whether the communication apparatus is in a mode where registration of communication with the slave unit has been deregistered by a deregistration unit, and in a case where the communication apparatus is not in the mode where the registration of communication with the slave unit has been deregistered, the detection unit detects the operation performed on the slave unit.

3. The communication apparatus according to claim 1, wherein, in a case where the slave unit periodically transmits the identification information to the wireless network without being requested by the communication apparatus, the detection unit detects the operation performed on the slave unit.

4. The communication apparatus according to claim 1, wherein the detection unit detects that the slave unit which is the transmission source of the identification information has transitioned to a mode where the registration of communication can be performed or a mode where deregistration of communication can be performed via the wireless network, based on the identification information received by the receiving unit.

5. The communication apparatus according to claim 1, further comprising a storage unit configured to store identification information of the slave unit that has been registered for communication by the registration unit,
    wherein, in a case where identification information matching the identification information received by the receiving unit is stored in the storage unit, the detection unit detects the operation performed on the slave unit.

6. The communication apparatus according to claim 5, wherein the storage unit stores, in association with each other, first identification information received from the slave unit before the communication with the slave unit is registered by the registration unit, and second identification information assigned to the slave unit by the communication apparatus after the communication with the slave unit is registered by the registration unit.

7. The communication apparatus according to claim 6,
    wherein, in a case where the identification information received by the receiving unit matches the first identification information stored in the storage unit, the detection unit detects the operation performed on the slave unit, and
    wherein the output unit performs control to output, to an outside, a first message notifying a user that registration of communication with the slave unit has been deregistered without involving the communication apparatus.

8. The communication apparatus according to claim 6,
    wherein, in a case where the identification information received by the receiving unit matches the second identification information stored in the storage unit, the detection unit detects the operation performed on the slave unit, and
    wherein the output unit performs control to output, to an outside, a second message forecasting that registration of communication with the slave unit is to be deregistered without involving the communication apparatus.

9. The communication apparatus according to claim 8,
    wherein the receiving unit receives information for deregistering the registration of communication with the slave unit transmitted to the wireless network from another communication apparatus capable of accessing the wireless network, and
    wherein, in a case where the identification information and the information for deregistering the registration of communication are received by the receiving unit within a predetermined time period, the detection unit detects the operation performed on the slave unit.

10. The communication apparatus according to claim 1, wherein, in response to the output alert, the output unit outputs, via a display device, an interface for receiving an input for causing a deregistration unit to deregister registration of communication with the slave unit.

11. The communication apparatus according to claim 1, wherein, in response to the output alert, the output unit outputs, via a display device, an interface for receiving an input for causing the registration unit to reregister the communication with the slave unit by assigning identification information identical to the identification information assigned to the slave unit.

12. The communication apparatus according to claim 1,
    wherein the wireless network in which the slave unit is registered by the registration unit is a wireless network compliant with a Z-Wave® standard, and
    wherein the registration unit includes the slave unit in the wireless network.

13. The communication apparatus according to claim 12, wherein the output unit generates an alert forecasting occurrence of exclusion of the slave unit without involving the communication apparatus, or notifying a user of the occurrence of exclusion of the slave unit performed by another communication apparatus that can access the slave unit.

14. The communication apparatus according to claim 12, wherein the identification information received by the receiving unit includes a Home ID indicating a wireless network to which the slave unit belongs, and a Node ID for identifying the slave unit on the wireless network, and is periodically transmitted from the slave unit to the wireless network while the slave unit is in a learn mode.

15. A communication apparatus comprising:
    an assignment unit configured to assign, to another communication apparatus on a wireless network, identification information for identifying the other communication apparatus on the wireless network;
    a registration unit configured to register the identification information assigned by the assignment unit;
    a receiving unit configured to receive the identification information assigned by the assignment unit from the other communication apparatus; and
    an output unit configured to output an alert in a case where the identification information is received by the receiving unit when the communication apparatus is not in a mode for deregistering registration of the other communication apparatus.

16. A control method of a communication apparatus, the control method comprising:
    registering a slave unit for communication on a wireless network;
    receiving identification information for identifying the slave unit on the wireless network, the identification information being periodically transmitted from the slave unit to the wireless network;
    detecting, in a case where the slave unit which is a transmission source of the received identification information is a slave unit that has been registered for communication by the communication apparatus, an operation performed on the slave unit without involving the communication apparatus; and
    outputting an alert in a case where the operation is detected by the detecting.

17. A non-transitory computer-readable storage medium that stores a program for causing a computer to function as:
    a registration unit configured to register a slave unit for communication on a wireless network;
    a receiving unit configured to receive identification information for identifying the slave unit on the wireless network, the identification information being periodically transmitted from the slave unit to the wireless network;
    a detection unit configured to detect, in a case where the slave unit which is a transmission source of the identification information received by the receiving unit is a slave unit that has been registered for communication by the registration unit, an operation performed on the slave unit without involving the communication apparatus; and an output unit configured to output an alert in a case where the operation is detected by the detection unit.

\* \* \* \* \*